US012579965B2

(12) United States Patent
Lunner et al.

(10) Patent No.: US 12,579,965 B2
(45) Date of Patent: Mar. 17, 2026

(54) ACTIVE NOISE CANCELLATION USING REMOTE SENSING FOR OPEN-EAR HEADSET

(71) Applicant: Meta Platforms Technologies, LLC, Menlo Park, CA (US)

(72) Inventors: Nils Thomas Fritiof Lunner, Redmond, WA (US); Morteza Khaleghimeybodi, Bothell, WA (US); Buye Xu, Sammamish, WA (US); Sang-Ik Terry Cho, Kirkland, WA (US); Sebastian Elliot Chafe, Seattle, WA (US); Muhammad Zubair Ikram, Richardson, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 381 days.

(21) Appl. No.: 18/126,876

(22) Filed: Mar. 27, 2023

(65) Prior Publication Data

US 2024/0331677 A1 Oct. 3, 2024

(51) Int. Cl.
| | |
|---|---|
| *G06T 7/50* | (2017.01) |
| *G10K 11/178* | (2006.01) |
| *H04R 1/10* | (2006.01) |

(52) U.S. Cl.
CPC .......... *G10K 11/17823* (2018.01); *G06T 7/50* (2017.01); *G10K 11/17881* (2018.01); *H04R 1/1083* (2013.01); *G06T 2207/30201* (2013.01); *G10K 11/17817* (2018.01); *G10K 11/17825* (2018.01); *G10K 2210/1081* (2013.01); *G10K 2210/3024* (2013.01); *G10K 2210/3026* (2013.01); *G10K 2210/3027* (2013.01);

(Continued)

(58) Field of Classification Search
CPC ....... G10K 11/17879; G10K 2210/129; G10K 2210/3215; G10K 11/17815; H04R 1/1075; H04R 2499/15; H04R 2201/105
USPC ........................................................ 381/71.6
See application file for complete search history.

(56) References Cited

U.S. PATENT DOCUMENTS

| | | | |
|---|---|---|---|
| 9,613,615 | B2 | 4/2017 | Nystrom |
| 10,038,966 | B1 | 7/2018 | Mehra |

(Continued)

OTHER PUBLICATIONS

European Search Report for European Patent Application No. 24158601.5, dated Jul. 18, 2024, 5 pages.

(Continued)

*Primary Examiner* — Carolyn R Edwards
*Assistant Examiner* — Friedrich Fahnert
(74) *Attorney, Agent, or Firm* — Greenberg Traurig, LLP

(57) ABSTRACT

An open-ear device performs active noise cancellation (ANC) for a user. A sensor located outside an ear of a user which does not occlude an ear canal of the ear and measures vibrational data indicative of a sound pressure level at a location outside the ear, or a level of pinna vibration of the user. A prediction pipeline generates a prediction of sound pressure within the ear canal using an individualized model, taking into account the measured vibrational data and the unique geometric shape of the user's head and pinna. This sound pressure prediction is used to generate audio instructions for rendering playback at an noise cancellation source, such as a bone conduction transducer and/or cartilage transducer, to perform ANC for the user by cancelling at least portion of the sound received at the ear canal.

20 Claims, 9 Drawing Sheets

(52) U.S. Cl.
CPC .... *G10K 2210/501* (2013.01); *H04R 2460/01* (2013.01); *H04R 2460/13* (2013.01)

(56) References Cited

U.S. PATENT DOCUMENTS

| | | | |
|---|---|---|---|
| 10,880,667 B1 | 12/2020 | Cho et al. | |
| 10,932,083 B2 | 2/2021 | Brimijoin, II et al. | |
| 10,993,029 B2 | 4/2021 | Donley et al. | |
| 11,197,083 B2 | 12/2021 | Jain et al. | |
| 11,303,258 B1 | 4/2022 | Bajic et al. | |
| 11,445,318 B2 | 9/2022 | Khaleghimeybodi | |
| 2020/0196066 A1 | 6/2020 | Khaleghimeybodi | |
| 2022/0030369 A1* | 1/2022 | Faundez Hoffmann | .................... H04R 3/04 |
| 2022/0343887 A1 | 10/2022 | Xiao et al. | |

OTHER PUBLICATIONS

Ho Cy., et al., "Integrated Active Noise Control for Open-fit Hearing Aids with Customized Filter," Applied Acoustics, Aug. 2018, vol. 137, 8 pages.

Xiao T., et al., "Spatially Selective Active Noise Control Systems," arxiv.org, Aug. 22, 2022, 11 pages.

Akhtar M.T., et al., "On Active Noise Control Systems with Online Acoustic Feedback Path Modeling," IEEE Transactions On Audio, Speech, And Language Processing, Feb. 2007, vol. 15, No. 2, pp. 593-600.

\* cited by examiner

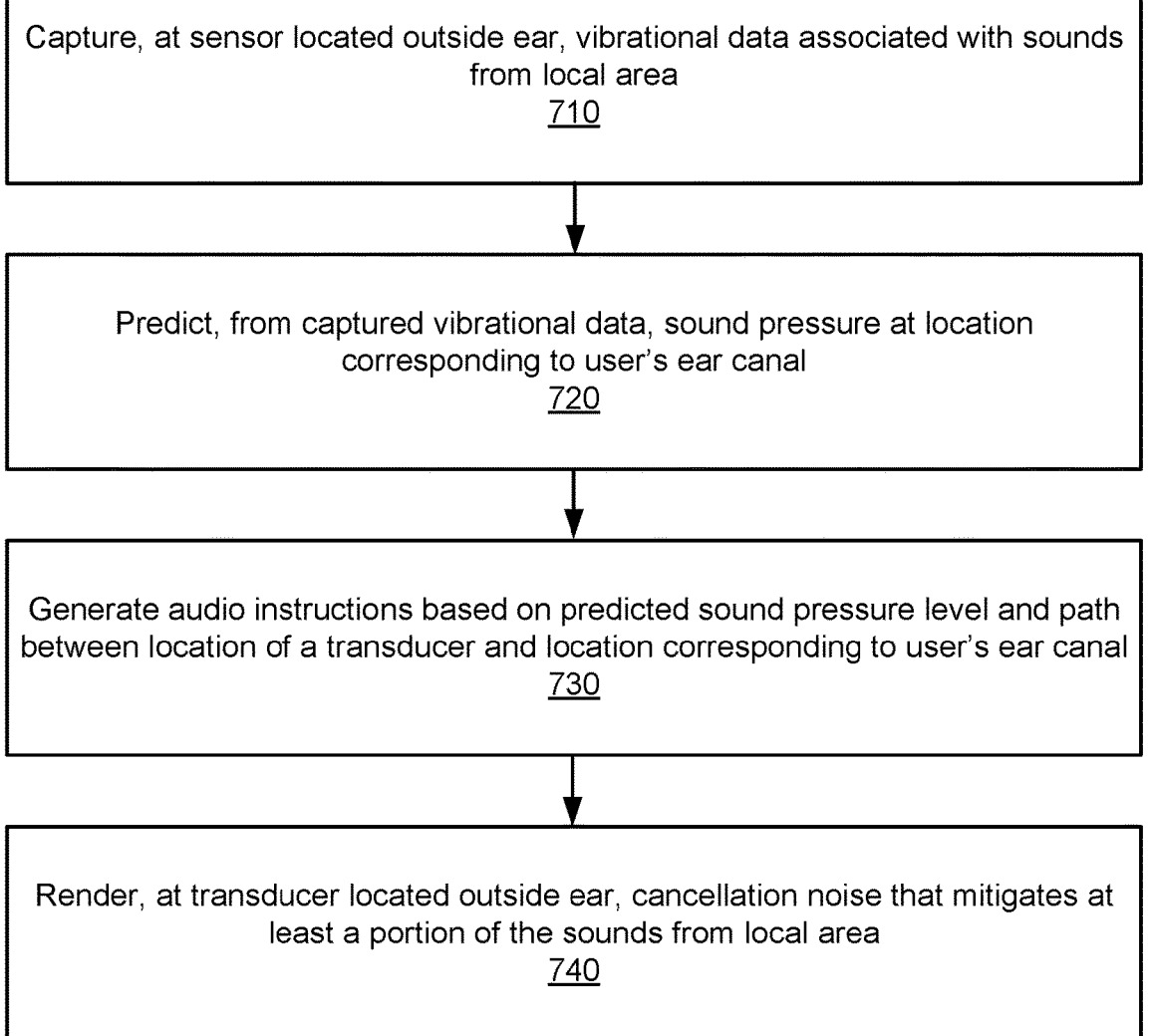

Capture, at sensor located outside ear, vibrational data associated with sounds from local area
710

Predict, from captured vibrational data, sound pressure at location corresponding to user's ear canal
720

Generate audio instructions based on predicted sound pressure level and path between location of a transducer and location corresponding to user's ear canal
730

Render, at transducer located outside ear, cancellation noise that mitigates at least a portion of the sounds from local area
740

ACTIVE NOISE CANCELLATION USING REMOTE SENSING FOR OPEN-EAR HEADSET

FIELD OF THE INVENTION

This disclosure relates generally to noise cancellation and audio processing, and more specifically to noise cancellation implemented on an open-ear headset.

BACKGROUND

Active noise cancellation (ANC) is used in many over-the-ear headphones and other blocked ear wearables, in which noise-cancelling speakers are used to reduce unwanted background noise. In a typical ANC system, a microphone located on the headphones is used to detect environmental sounds near the location of the user's ear, and a speaker inside the headphones creates an inverse signal that cancels the outside sound via neutralizing soundwaves.

SUMMARY

In some aspects, the techniques described herein relate to a headset including a sensor located on a portion of the headset outside an ear of the user, wherein the sensor is configured to measure vibrational data associated with sounds from a local area, and a transducer located outside the user's ear. The headset further comprises an audio controller configured to predict, from the vibrational data, a sound pressure level at a location corresponding to an entrance to an ear canal of the user's ear; generate audio instructions based on the predicted sound pressure level; cause the transducer to render playback that mitigates the sounds from the local area, based on the predicted sound pressure level at the location corresponding to the user's ear.

In some aspects, the techniques described herein relate to a system including a headset to be worn by a user, the headset including: a sensor located on a portion of the headset outside an ear of the user, wherein the sensor is configured to measure sound-induced (or noise-induced) vibrational data associated with sounds from a local area, and a transducer located outside the user's ear. The system further comprises an audio controller configured to: predict, from the vibrational data, a sound pressure level at a location corresponding to an entrance to an ear canal of the user's ear; generate audio instructions based on the predicted sound pressure level cause the transducer to render playback that mitigates the sounds from the local area, based on the predicted sound pressure level at the location corresponding to the user's ear.

BRIEF DESCRIPTION OF THE DRAWINGS

FIG. 7 is a flowchart of a method for performing remote ANC, in accordance with some embodiments.

Figure 1A:
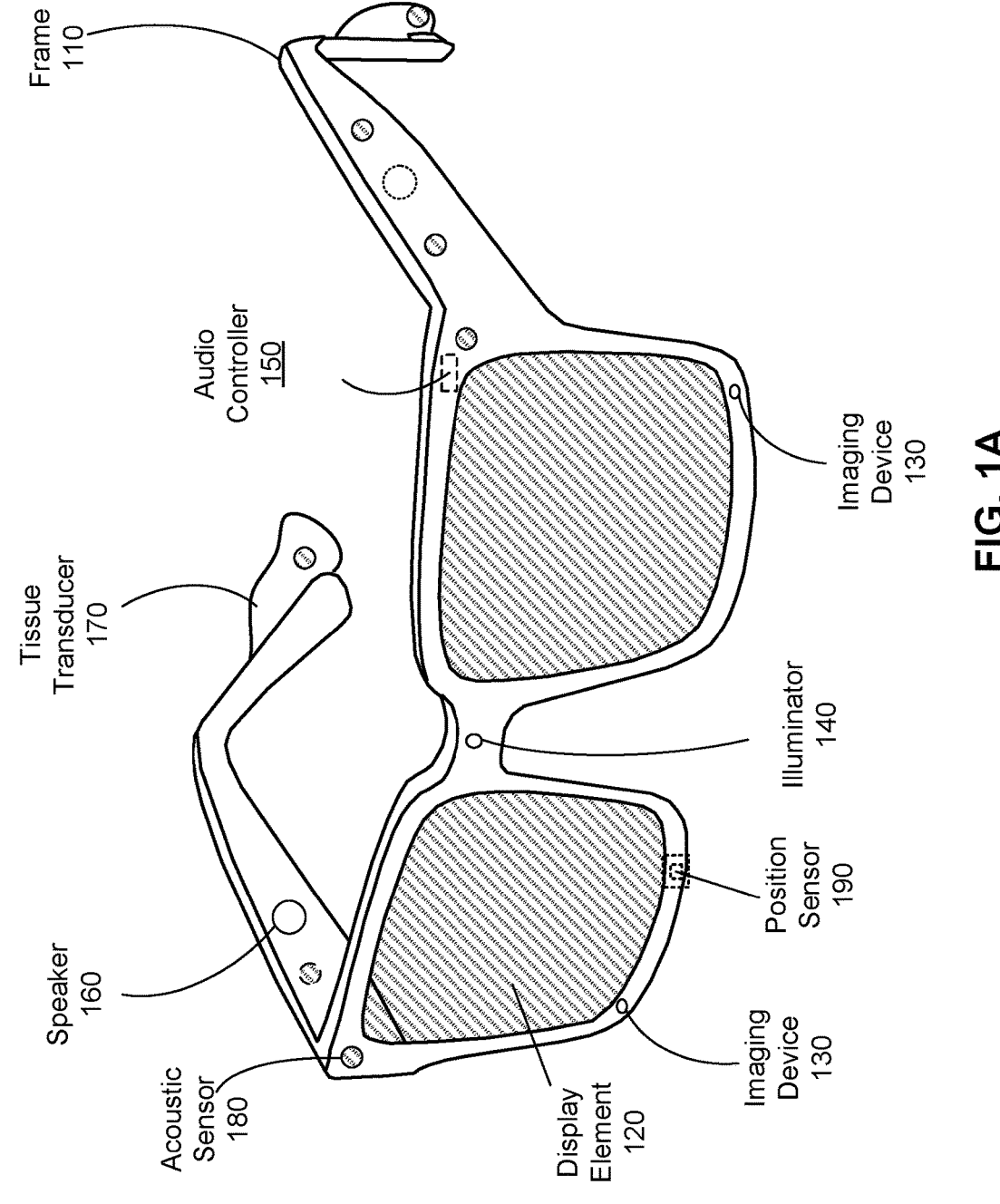
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Active Noise Control (ANC) utilizes wave superposition principles, in which a waveform of a primary sound (e.g., a noise to be canceled, such as environmental noise) is superimposed on its inverse virtual twin (also referred to as anti-noise) that is created by a secondary source (e.g., a loudspeaker), achieving deconstructive interference and thereby noise cancellation. In many over-the-ear headphones and other blocked ear wearables, noise cancellation is performed using a combination of passive and active noise cancellation techniques. For example, over-the-ear headphones typically contain an ear cup or other structure that blocks noise from the outside environment from reaching the user's ear canal, performing passive attenuation of the outside noise. In addition, ANC may be performed in which a microphone, located on an outer surface of the ear cup near an entrance of the user's ear canal, is used to detect a level of outside noise, which is used to generate an anti-noise signal created using a speaker located at or within the user's ear canal. The summation of the incoming noise and anti-noise causes noise cancellation.

In certain types of wearable devices (referred to as open-ear devices), it is desirable for the user's ear canals to be left open, e.g., without any hardware components located directly outside or within the user's ear canal, so as not to occlude the user's ear canal. Open-ear device may include augmented reality (AR) glasses, which allow a user to hear sound from the outside environment, but may also augment or modify the sound heard by the user, such as by amplifying or cancelling at least a portion of the sound. However, open-ear devices present certain challenges for performing ANC, as in order to not occlude the user's ear canal, they cannot any hardware components such as sensors or microphones located directly outside or within the user's ear canal. As such, they may not be able to directly measure the sound pressure within the user's ear canal for which to produce appropriate anti-noise and deliver a convincing ANC experience.

Embodiments relate performing ANC on an open-ear device, by performing remote estimation of sound pressure within the user's ear canal using a sensor located outside the user's ear which does not occlude the user's ear canal. In some embodiments, the sensor comprises a microphone configured to measure a sound pressure level at a location outside the user's ear. In other embodiments, the sensor is configured to measure a level of pinna vibration of the user. A processor, which may be part of the headset or in separate device (e.g., in a cuff, console or other device), is configured to process data generated by the sensor (e.g., corresponding to sound level at a location outside the user's ear, a level of pinna vibration, etc.) using a prediction pipeline to generate a prediction of sound pressure within the user's ear canal. This sound pressure prediction is used to generate audio instructions for rendering playback at a noise cancellation source, such as an air conduction transducer, a bone conduction transducer and/or cartilage transducer, to perform ANC for the user by cancelling at least portion of the sound received at the user's ear canal. In some embodiments, a combination of more than one transduction method (such as a combination of air conduction and cartilage conduction) may be used to perform the active noise cancellation. In such scenarios, crossover filters may be used to define how different portions of the audio bandwidth are covered using different transduction mechanisms. For instance, in some cases, low frequency contents are sent to the cartilage conduction transducer, and the mid to high frequency contents are sent to the air conduction transducers.

In some embodiments, the prediction pipeline uses an individualized model to predict the sound pressure level within the user's ear canal, that takes into account the unique geometric shape of the user's head and pinna. In some embodiments, the individualized model may be driven from one or more individual head-related transfer functions (HRTFs) determined for the user. In some embodiments, the individualized model is generated using machine-learning techniques, and configured to receive information including vibrational data (from a microphone or a vibrational sensor), directional information associated with the vibrational data, and information indicating the user's head and pinna shape, in order to produce a prediction of the sound pressure level within the user's ear. In some embodiments, where the noise cancellation source is at a location outside the user's ear, the model may further generate a level of anti-noise to be produced by the noise cancellation source based on the predicted sound pressure level and a location differential between the user's ear canal and the anti-noise source.

In some embodiments, being able to perform active noise cancellation using remote sensors outside the user's ear allows for active noise-cancellation functionality to be integrated into a wider variety of devices, including open-ear devices in which the opening of the user's ear canal is unobstructed, without changing the form factor of the devices. In addition, the ability to perform active noise cancellation on open-ear devices can be used in applications in which the noise cancellation is used selectively. For example, a pair of AR glasses, in accordance with some embodiments, may be configured to perform active noise cancellation for certain types of sounds or during certain time periods, without inhibiting the user's ability to hear environmental noise not being cancelled or during time periods in which active noise cancellation is not being utilized.

Embodiments discussed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), an in-ear device, a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

In some embodiments, the imaging devices 130 may also include one or more image devices to capture image data of the user's eye and/or user's head. For example, the imaging devices 130 may capture image data of the user's eye (e.g., for eye tracking purposes), image data of tissue movements of the user's cheek and/or head (e.g., for determination of blood pressure levels).

The audio system provides audio content. The audio system includes a transducer array, a sensor array, and an audio controller 150. In various embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor captures sounds emitted from one or more sound sources in the local area (e.g., a room). Each acoustic sensor is configured to detect sound and convert the detected sound into an electronic format (analog or digital). The acoustic sensors may be acoustic wave sensors, microphones, sound transducers, or similar sensors that are suitable for detecting sounds.

In some embodiments, the acoustic device may be placed on an exterior surface of the headset 100, placed on an interior surface of the headset 100, separate from the headset 100 (e.g., part of some other device), or some combination thereof. The number and/or locations of acoustic devices may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100. For example, in some embodiments, the acoustic detection locations are located on various locations on the frame of the headset 100 that do not obstruct the user's ear canal when the headset 100 is worn by the user.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

For example, in some embodiments, the audio controller 150 receives data from one or more of the acoustic sensors 180 corresponding to acoustic data (e.g., sound pressure levels) measured at different acoustic detection locations outside the user's ear. The audio controller 150 processes the received data through a prediction pipeline (discussed in greater detail below in relation to FIGS. 2 and 3) to predict a sound pressure level at a location corresponding to an entrance of the user's ear canal. Based upon this prediction, the audio controller 150 generates audio instructions for one or more transducers (e.g., transducers 170) to render playback that cancels at least a portion of the predicted sound pressure level, thus allowing for the headset 100 to perform active noise cancellation, despite the lack of any sensors or other hardware at or near the user's ear canal. In some embodiments, two or more transducers are used to render playback, to beamform the sound to be directed to the entrance of the user's ear canal.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA May also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
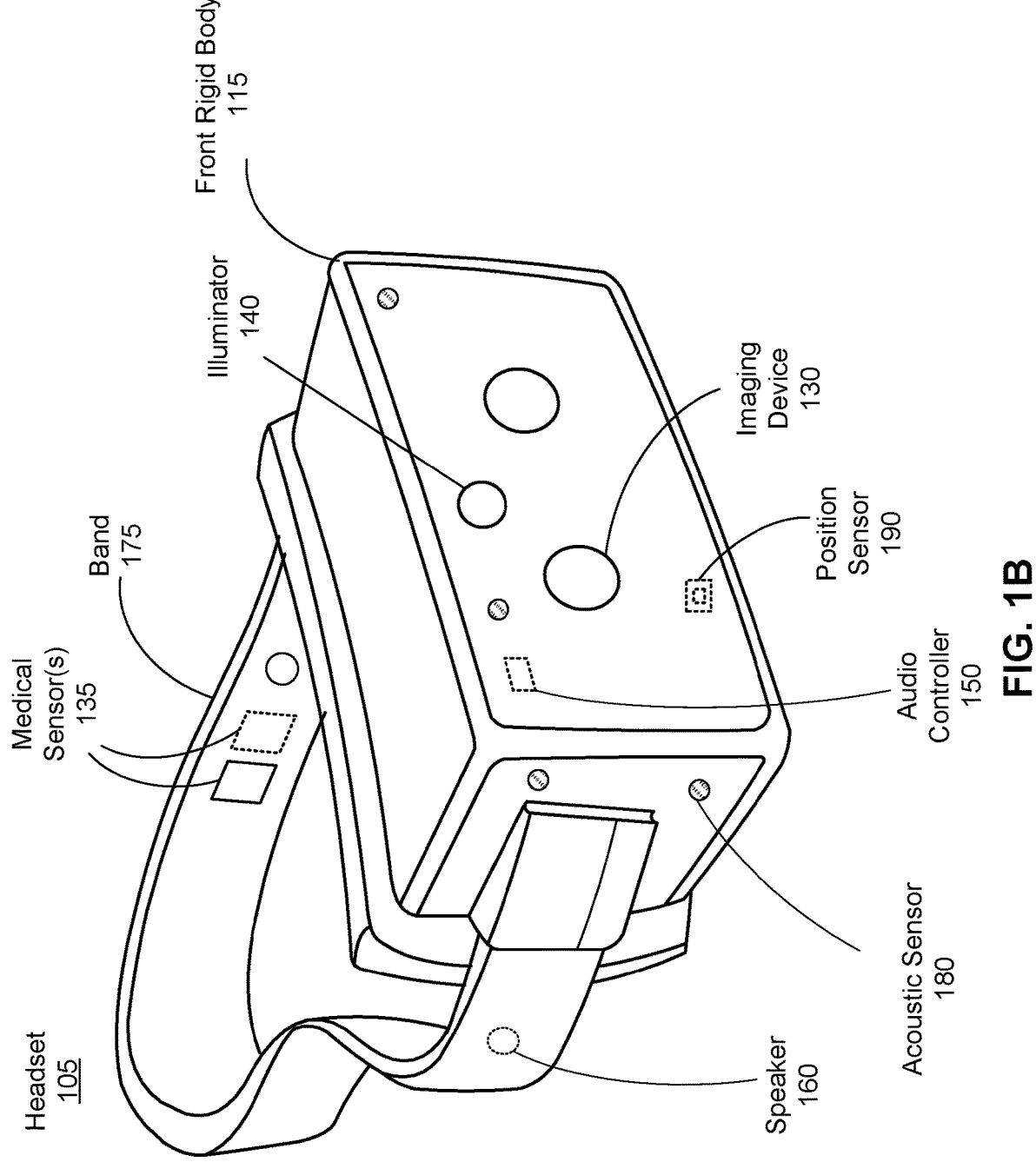
FIG. 1B is a perspective view of a headset implemented as an HMD, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA (e.g., including a plurality of imaging devices and/or the illuminator 140), an audio system (e.g., including a plurality of speakers 160 and/or a plurality of acoustic sensor 180), a position sensor 190, etc. The speakers 160 may be located in various locations, such as coupled to the band 175 (as shown), coupled to front rigid body 115. In some embodiments, as discussed in relation to FIG. 1A, the audio system may receive data from acoustic sensors 180 located outside the user's ear, process the data using a prediction pipeline to predict a level of sound at the user's ear (e.g., at an entrance of the user's ear canal), and generate audio instructions for rendering playback by the speakers 160 to cancel at least a portion of the predicted sound.

The headset (e.g., headset 100 or 105) is an open-ear device, in that the headset does not contain any in-ear hardware components or any components directly outside the user's ear. For example, the headset does not perform observation of sound pressure in the user's ear canal using sensors (e.g., a microphone) placed at the entrance of the ear canal or within the ear canal, but instead utilizes remote sensing techniques, described in greater detail below, to estimate a sound pressure level of the user's ear canal, with which to generate anti-noise for performing active noise cancellation.

Figure 2:
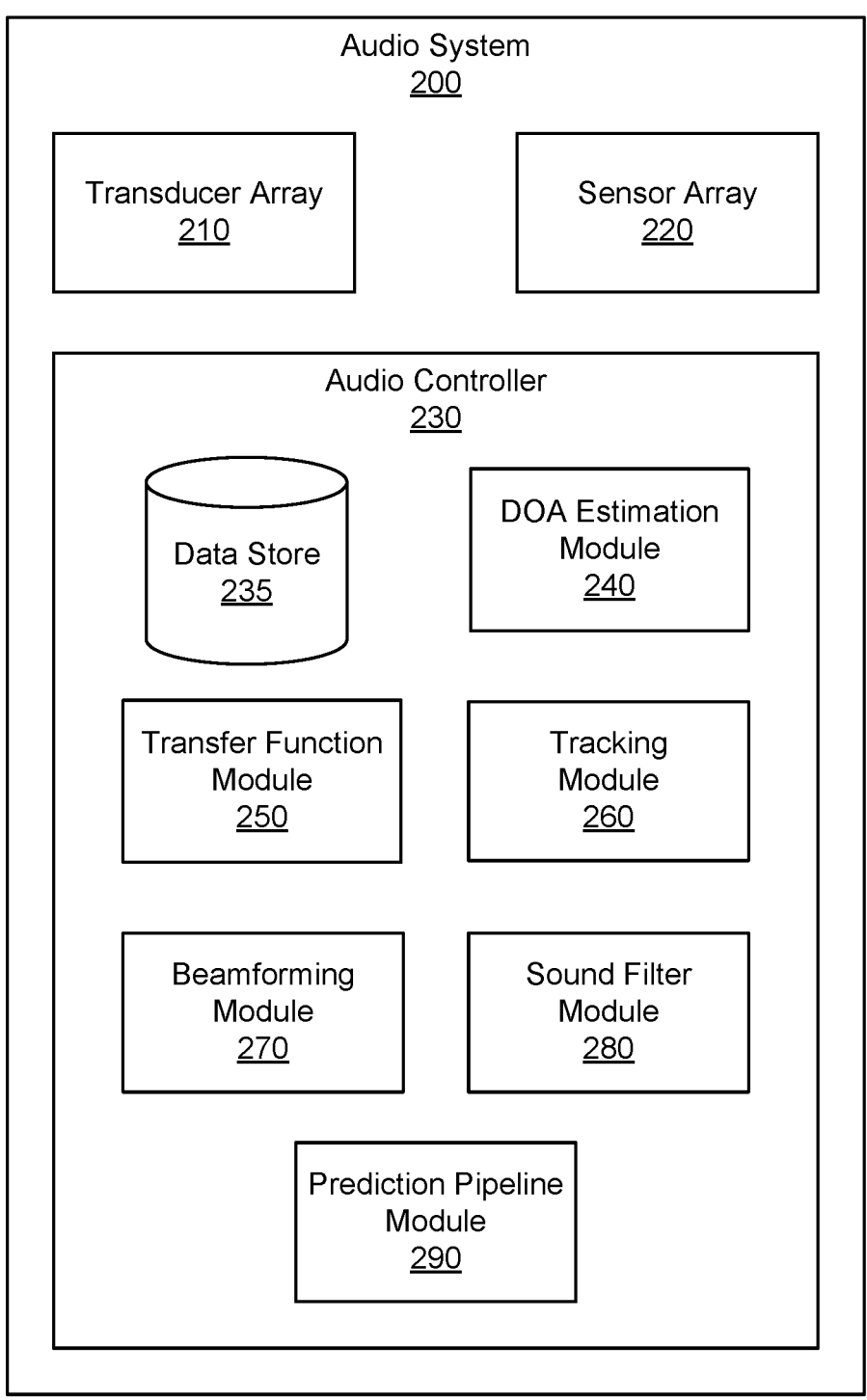
FIG. 2 is a block diagram of an audio system, in accordance with one or more embodiments.

FIG. 2 is a block diagram of an audio system 200, in accordance with one or more embodiments. The audio system in FIG. 1A may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here. For example, in some embodiments, one or more components of the audio system 200, such as the audio controller 230, may be located outside the headset, such as on a peripheral device paired with the headset, an external console, a server, and/or the like.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100).

In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100), on a user, on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, and prediction pipeline module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof. In some embodiments, the data store 235 may store individualized models used by the prediction pipeline module 290 to generate sound pressure predictions.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the transducer array 210. In some embodiments, the sound filters may cause positive or negative amplification of sounds as a function of frequency.

The prediction pipeline module 290 receives data from the sensor array 220, and processes the received data using an individualized model to generate a prediction of a sound pressure level within the user's ear canal. The prediction pipeline module 290 further generates data indicating a level of anti-noise to be produced by one or more noise cancellation sources (e.g., corresponding to one or more transducers of the transducer array 210) for cancelling at least a portion of the sound within the user's ear canal, to provide active noise cancellation for the user.

How the headset (e.g., AR glasses) fits on the head of the user may be different for different users. In addition, the different head and ear shapes of different users will influence the acoustic response of sound rendered by the audio system (e.g., via the transducer array 210) as heard by the user. The individualized model is customized to specific users based upon the geometric properties of the user's head and ears, as well as an expected position of the headset on the user's head when worn by the user, so as to be able to provide a consistent ANC experience for different users. In some embodiments, the individualized model is generated using machine learning techniques, and trained to receive input data received from the sensor array 220 to generate the sound pressure prediction and/or instructions for rendering a level of anti-noise, based on the geometric properties of the user's head and ears and expected position of the headset on the user's head (collectively, user geometry data). In some embodiments, the prediction pipeline module 290 uses the individualized model to configure one or more ANC filters that process a signal corresponding to the predicted sound pressure level to produce a signal corresponding to the anti-noise to the rendered, based on the user geometry data.

In some embodiments, the individualized model is constructed based upon one or more calibration steps performed with an individual user. In some embodiments, the user may be instructed to, while wearing the headset (e.g., AR glasses), capture one or more images and/or videos of their head and ears. The images and/or video may capture details of the user's pinnae such as their helix, concha bowl, etc., and may be used to create the individualized model used by the prediction pipeline 290 for predicting a sound pressure level in the user's ear canal. In some embodiments, one or more acoustic-based calibration steps may be performed. For example, predefined audio content (e.g., a short piece of music, white noise, sweep, etc.) may be rendered from the headset (e.g., via speaker 160) or from another device while the user is wearing the headset, where audio data captured by acoustic sensors of the sensor array 220 is used to create individualized models characterizing the audio output from the transducers to the sensor. In some embodiments, data from calibration may be used to modify a generalized model (e.g., a preconstructed model based upon aggregate properties of a group of users) to construct the individualized model for the user.

By monitoring the sound pressure within the user's ear canal (e.g., residual sound pressure in the ear after enabling ANC filters) in real-time based on data received from the sensor array 220, and accurately characterizing a secondary path from the noise cancellation source to the user's ear, the prediction pipeline module 290 adaptively adjusts a level of anti-noise rendered by the noise cancellation source (e.g., of the transducer array 210), e.g., by adjusting one or more ANC filters that process a signal corresponding the predicted sound pressure data to generate a signal corresponding to the anti-noise to be rendered by the noise cancellation source. In some embodiments, one or more sensors of the sensor array 220 are used for feedback ANC, where the received sensor data is processed by the prediction pipeline module 290 to predict the sound pressure level within the user's ear canal (e.g., residual sound pressure). For example, in some embodiments, discussed in greater detail below, a sensor of the sensor array 220 may capture vibration of the user's pinna, where the measure vibrational information is processed by the prediction pipeline module 290 to generate predicted sound pressure information used to provide feedback for ANC.

In other embodiments, the sensor array 220 may also include sensors used for feed-forward ANC. For example, in some embodiments, the sensor array 220 includes one or more microphones (e.g., a microphone array) that serve as a reference microphone for feed-forward ANC, in which sound pressure information captured via the one or more microphones is processed by the prediction pipeline module 290 based upon the characterized secondary path to generate a level of anti-noise for cancelling at least a portion of the measured sound pressure. In some embodiments, a combination of feedback and feed-forward ANC is used, in which one or more microphones of the sensor array 220 function as reference microphones measuring feedforward sound pressure data, and one or more additional sensors of the sensor array 220 (e.g., a remote optical sensor, described in greater detail below) functions as a feedback sensor for monitoring a residual sound pressure in the user's ear canal after ANC is applied.

Figure 3:
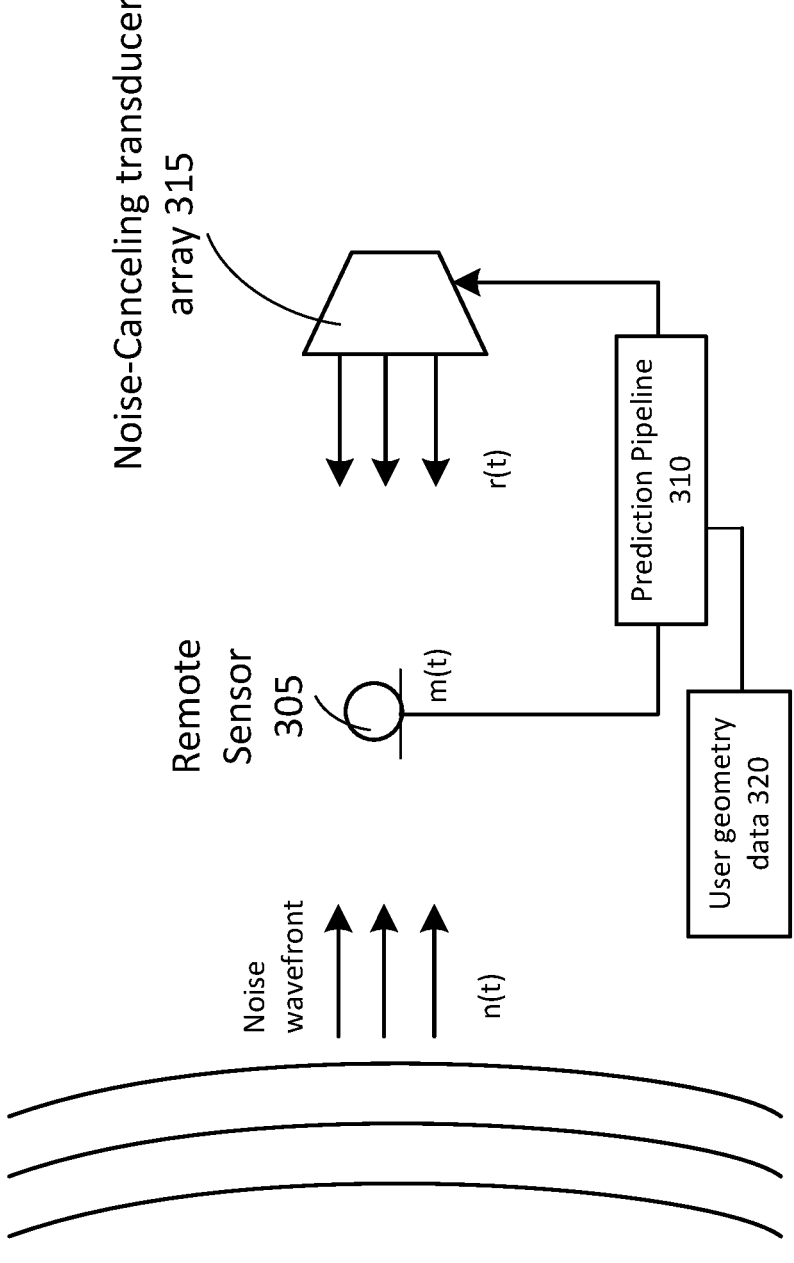
FIG. 3 illustrates a high level diagram of performing ANC using a remote sensor and prediction pipeline, in accordance with some embodiments.

FIG. 3 illustrates a high level diagram of performing ANC using a remote sensor 305 and prediction pipeline 310, in accordance with some embodiments. In some embodiments, the remote sensor 305 corresponds to one or more sensors of the sensor array 220, the prediction pipeline 310 corresponds to the prediction pipeline module 290, and a noise-cancelling transducer array 315 corresponding to at least a portion of the transducers of the transducer array 210. The remote sensor 305 and the transducer 315 are both located outside the user's ear when the headset is worn by the user, e.g., not obstructing the entrance of the user's ear canal or located on an inner surface of the user's pinna. For example, where the headset corresponds to a set of AR glasses, at least one of the remote sensor 305 and the noise-cancelling transducer 315 are located on or within a temple arm of the glasses. In some embodiments, the noise cancelling transducers utilize bone and/or cartilage conduction, reducing leakage in comparison to air conduction-based approaches. In embodiments in which at least a portion of the noise-cancelling transducers utilize air conduction, the noise-cancelling transducers may be configured to create acoustic dipole patterns to create null planes in given direction (such as forward direction), reducing an amount of audio leakage that may be heard by other individuals near the user.

Figure 4:
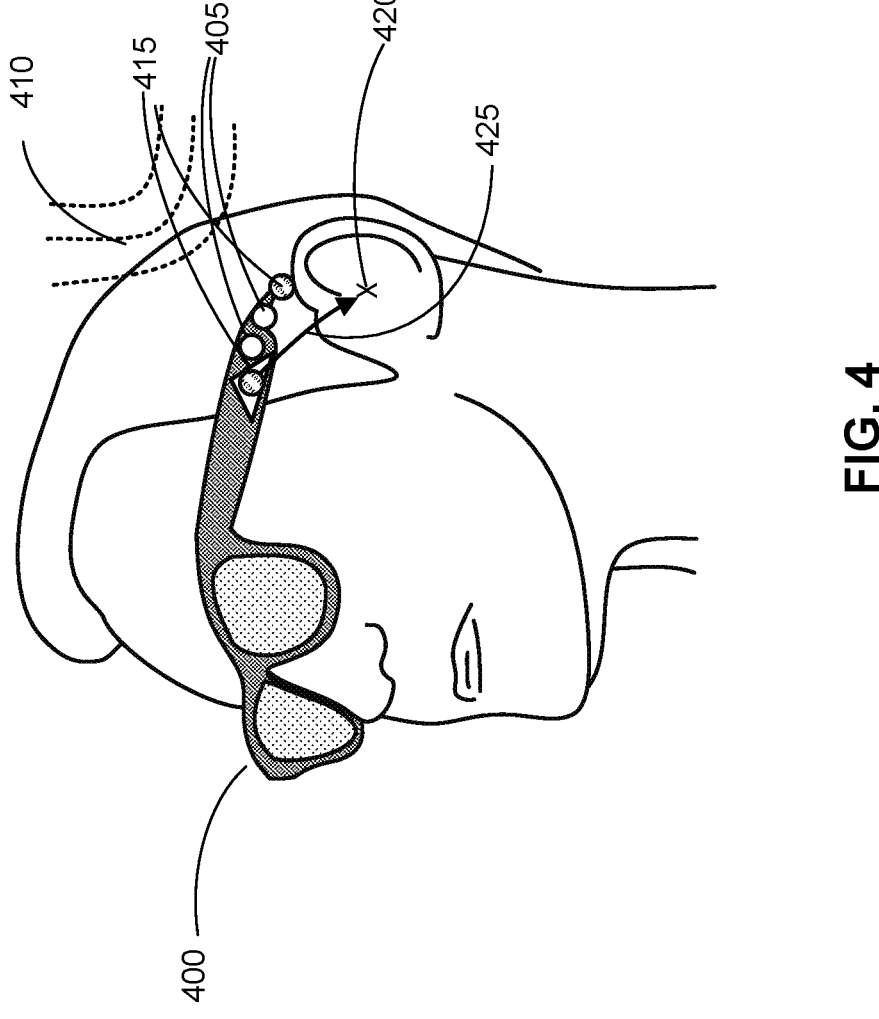
FIG. 4 illustrates a diagram of a user wearing a headset in which sound pressure data from a microphone located outside the user's ear is used to perform ANC, in accordance with some embodiments.

In some embodiments, the remote sensor 305 is a microphone located outside the ear of the user, and configured to measure vibrational data corresponding to a sound pressure level at a location outside the user's ear. FIG. 4 illustrates a diagram of a user wearing a headset 400 in which sound pressure data from one or more microphones 405 located outside the user's ear is used to perform ANC, in accordance with some embodiments. The headset 400 shown in FIG. 4 may correspond to the headset 100 of FIG. 1A, and includes the microphones 405 corresponding to the remote sensor 305 illustrated in FIG. 3 that is configured to measure a sound pressure level at a location that is outside the user's ear (e.g., on a temple arm of the headset 400). The measured sound pressure level may correspond to sound received at locations of the microphones 405 from one or more sound sources in the outside environment via a primary path 410. In some embodiments, the primary path 410 corresponds a direction from which the sound is received. The prediction pipeline 310 receives data indicating a sound pressure level measured by the microphones 405 at their respective locations, as well as information indicating a direction of the sound of the primary path 410 (e.g., as determined using the DOA estimation module 240), and processes the received data to generate a prediction of a sound pressure level at a location 420 corresponding to an entrance to the user's ear canal. In addition, the prediction pipeline 310 determines an amount of anti-noise to be generated by the noise-cancelling transducer array 315, based on the sound level prediction for the location 420, as well as a secondary path corresponding to a positional deviation between the noise-cancelling transducer array 315 and the location of the entrance of the user's ear canal 420. The noise-cancelling transducer array 315 renders playback based on the determined anti-noise, which serves to cancel at least a portion of the sound pressure at the user's ear canal. For example, FIG. 4 illustrates transducers 415 corresponding to the noise-cancelling transducer array 315 located on an arm of the headset 400 and outside the user's ear. In some embodiments, the transducers 415 are loudspeakers located at different locations outside the user's ear, in order to beamform the anti-noise audio provided to the user (e.g., using the beamforming module 270). Based on the secondary paths between the transducers 415 and the entrance of the user's ear canal 420 (e.g., secondary path 425), the prediction pipeline 310 determines an amount of anti-noise to be rendered by the transducers 415 in order to cancel a desired portion of the sound pressure predicted at the user's ear canal location 420. While FIG. 4 illustrates the headset having multiple microphones 405 used to determine a sound pressure level at multiple points outside the user's ear, it is understood that in other embodiments, the remote sensor 305 may correspond to a single microphone. In addition, in some embodiments, the noise-cancellation transducer array 315 may comprise a single transducer.

Figure 5B:
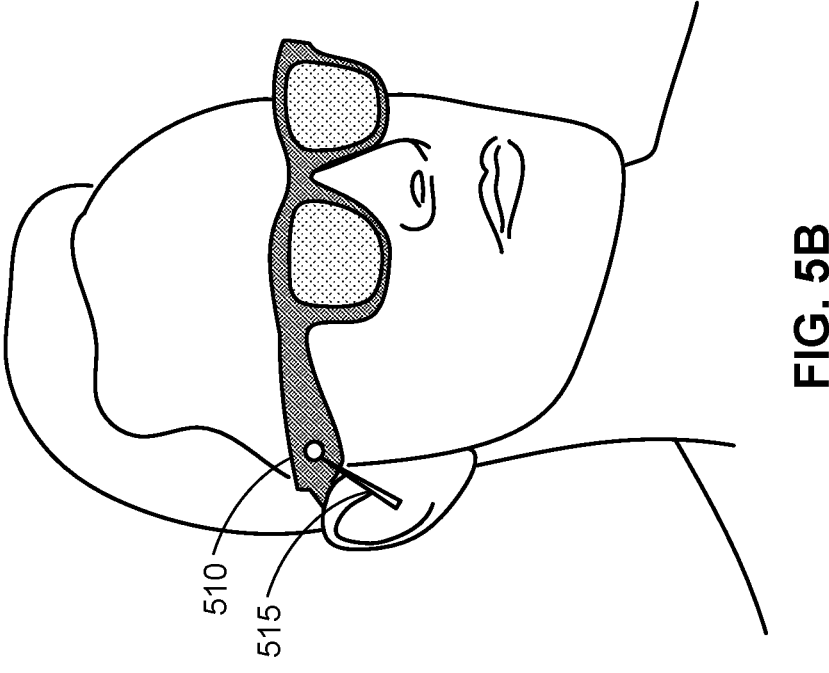
FIGS. 5A and 5B illustrate diagrams of a user wearing a headset containing sensors configured to measure the user's pinna vibrations, in accordance with some embodiments.
Figure 5A:
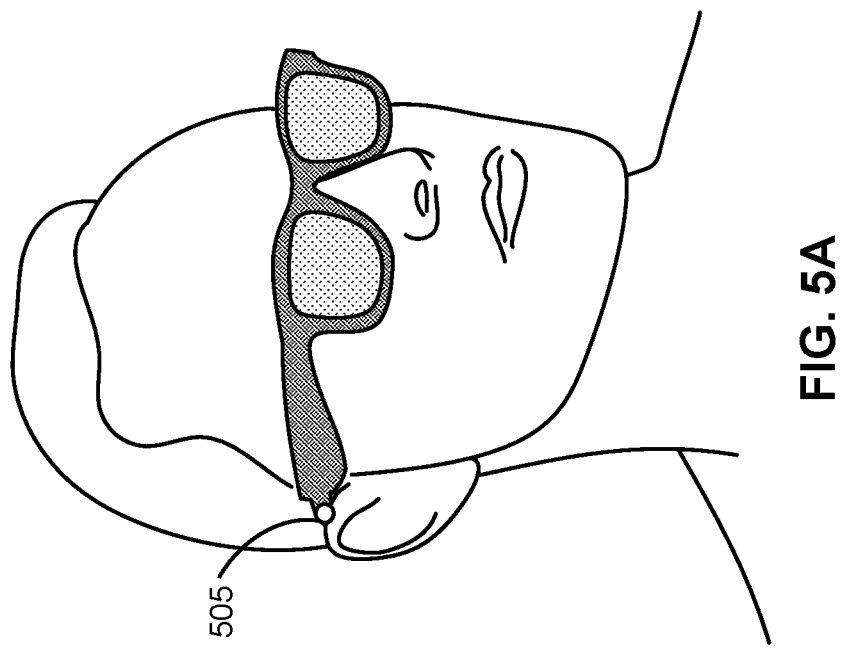

In some embodiments, the remote sensor 305 is configured to measure vibrational data corresponding to a level of vibration of the user's pinna, which may be used to infer a level of sound pressure within the user's ear canal. FIGS. 5A and 5B illustrate diagrams of a user wearing a headset containing sensors configured to measure the user's pinna vibrations, in accordance with some embodiments.

FIG. 5A illustrates an embodiment where the remote sensor corresponds to a contact sensor 505, such as a high-bandwidth contact accelerometer (also referred to as a contact microphone), such as an audio accelerometer, located on a temple arm of the headset. The contact sensor 505 is configured to be in contact with the user's pinna (e.g., on top of the user's ear) when the headset is worn by the user, from which it captures sound-induced pinna vibrations. In some embodiments, the contact sensor 505 may be an optical sensor (e.g., optical contact microphone).

FIG. 5B illustrates an embodiment where the remote sensor corresponds to a remote optical sensor 510. The optical sensor 510 may correspond to an optical laser, remote sensing beam, and/or the like, and is configured to sense a vibration level at a specific location of the user's pinna, e.g., the user's concha bowl. For example, in some embodiments, the optical sensor 510 generates a pinna-targeted beam 515 (e.g., a laser beam) targeted to a target portion of the user's pinna, such as a location on the user's concha, to remotely sense the sound-induced pinna vibrations of the user. Although FIGS. 5A and 5B each illustrate a single sensor, it is understood that in other embodiments, multiple sensors may be used to measure vibrations at multiple locations of the user's pinna.

Turning back to FIG. 3, in some embodiments, the prediction pipeline 310 receives the vibration values generated by the remote sensor 305 (e.g., contact sensor 505 or optical sensor 510) and transforms the vibration values into corresponding sound pressure values using a deep learning pipeline. In some embodiments, the prediction pipeline 310 uses a machine learning model that is trained on the vibrodynamics of human pinnae and how compliant human pinnae are in response to different sounds (e.g., different loudness levels). In some embodiments, the machine learning model further receives geometry data associated with the individual user, e.g., indicating a pinna shape of the user, in order to estimate sound pressure values that take into account the unique head and/or ear geometries of different users, and generate more accurate data characterizing the anti-noise to be rendered for performing noise cancellation.

As discussed above, the noise-cancelling transducer array 315 is configured to render playback based upon an amount of anti-noise determined by the prediction pipeline 310, in order to cancel at least a portion of the sound pressure at the user's ear canal. In some embodiments, due to the open-ear nature of the headset, the effective bandwidth and overall loudness of audio playback that can be achieved with a loudspeaker may be limited. Instead, transducer solutions having different transduction mechanisms (e.g., air conduction, tissue conduction, or hybrid solutions) may be utilized in order to enhance a bandwidth and volume of the anti-noise that may be rendered. For example, in some embodiments, to be able to achieve 10 dB of noise attenuation for an incoming 94 dB of environmental noise at 100-500 Hz frequency range, transducers utilizing bone and/or cartilage conduction that can reproduce a minimum of 90 dB in those frequency bands (i.e., 90 dB of sound pressure between 100-500 Hz, but phase-inverted) may be used. In some embodiments, the noise cancelling transducer array 315 comprises a plurality of transducers utilizing different transduction mechanisms, and is configured to render playback as a combination of two or more of mechanisms (e.g., air conduction, cartilage conduction, or bone conduction), to cover different parts of a frequency range. For example, in some embodiments, one or more tissue transducers may be used to render playback for cancelling audio of frequencies below a threshold value, while one or more loudspeakers may be used to render playback for cancelling audio of frequencies above the threshold value.

The remote sensor 305 generates measurement data m(t) over time, responsive to a noise wavefront n(t) corresponding to sound in a local area of the user and any noise cancellation r(t) being generated by the noise cancelling transducer array 315. As discussed above, the measurement data m(t) may correspond to sound pressure data measured at a location outside a user's ear, and/or pinna vibrational data resulting from sound pressure waves in the user's ear canal (e.g., caused by noise n(t)). In some embodiments, the measurement data m(t) may further indicate a direction of the noise wavefront n(t) relative to the user's head.

The prediction pipeline 310 receives the measurement data m(t) and predicts a level of playback r(t) to be rendered by the noise-cancelling transducer array 315, based on the measurement data m(t), as well as user geometry data 320. In some embodiments, the prediction pipeline 310 predicts the level of playback r(t) based on an individualized model generated using the user geometry data 320, which may be generated using one or more of the calibration steps discussed above. For example, in some embodiments, audio system uses images and/or video captured of the user's head and ears to generate user geometry data 320, which is used to construct and/or modify the individualized model used by the prediction pipeline 310 to predict a level of playback r(t) to be rendered by used on measurement data m(t). In some embodiments, the prediction pipeline predicts, based upon measurement data m(t), a sound pressure level at an entrance of the user's ear canal e(t)=m(t)*x(t) (where x(t) corresponds to an individualized filter applied to the measured data by the prediction pipeline 310), which is used to predict the level of playback r(t). In some embodiments, the remote sensor 305 functions as a feedback sensor, where the sound pressure level e(t) predicted from measurement data m(t) serves as an error signal, where the prediction pipeline 310 is configured to minimize the error e(t) using one or more least mean square approaches (e.g., Filtered Least Mean Squared, or FxLMS) to generate the level of playback r(t).

In some embodiments, the prediction pipeline 310 may further receive measure data from one or more feedforward sensors (not shown in FIG. 3). In some embodiments, the one or more feedforward sensors may be implemented as one or more microphones (e.g., air conduction microphones) located on the headset outside the user's ear configured to measure a sound pressure level of a local area of the user (e.g., sound pressure caused by noise wavefront n(t)). The measured sound pressure level of the feedforward sensors is provided to the prediction pipeline 310 for use in predict the level of playback r(t). In some embodiments, the prediction pipeline predicts the level of playback r(t) based on the feedforward sound pressure as measured by the feedforward sensors, and feedback sound pressure predicted based upon the measurement data m(t) measured by the remote sensor (e.g., pinna vibration data). For example, the prediction pipeline 310 may process the sound pressure data measured by the feedforward sensors with one or more adaptive filters to generate a level of playback r(t) to cancel at least a portion of the noise wavefront n(t), and measurement data m(t) from the remote sensor 305 to predict an error level e(t) and update the adaptive filter coefficients.

The noise cancelling transducer array 315 renders the playback r(t) that mitigates at least a portion of the sound from the local area (e.g., caused by the noise wavefront n(t)) at the user's ear canal. The resulting combination (m(t)=n(t)+r(t)) is measured by the remote sensor 305, and used to adjust the level of playback r(t) to achieve a desired amount of cancellation. In some embodiments, the prediction pipeline 310 may further take into account latency of the pipeline (e.g., from the remote microphone to prediction at the ear canal, to creating of the anti-noise signal and canceling at the ear canal) to predict a level of playback r(t) to compensate for a predicted a future sound pressure level.

The user geometry data 320 comprises geometric data indicative of a shape of the user's head and/or ears. In some embodiments, the user geometry data 320 may further comprise data indicating a spatial relationship between components of the headset (e.g., the remote sensor 305 and the noise-cancelling transducer array 315) and locations on the user's head (e.g., the entrance of the user's ear canal) when the headset is worn by the user. In some embodiments, the user geometry data 320 is determined based on captured pictures or video of the user's head and outer ears, which may be used to generate a model of the shape of the user's head and/or ears. The user geometry data 320 is processed to create individualized ANC filters used by the prediction pipeline 310 to transform predicted sound pressure at a remote location (e.g., at the remote sensor 305) to the corresponding sound pressure values at the target location (e.g., at an entrance to the ear-canal). In some embodiments, the user geometry data 320 is further usable for creating individualized HRTF filters for different subjects (e.g., by the transfer function module 250).

In some embodiments, the user geometric data 320 is predetermined as part of a one-time calibration for each user. In other embodiments, at least a portion of the user geometric data 320 may be dynamically generated based on one or more sensor on the headset. For example, in some embodiments, the headset may contains one or more sensors used to determine a position of the headset on the user's head, to account for possible different positions whenever the user puts on the headset.

The frequency response of a human pinna in response to acoustic stimuli may be complex and highly individual. For example, the multi-modal response of the pinna to a sound may be affected by the shape of the pinna, the multi-layer nature of the flesh, cartilage, and soft tissues of the pinna, and also its complex material properties. By measuring the response of a user's pinna to different frequencies of noise, a model can be generated that maps different levels of pinna vibration to corresponding levels of sound pressure, allowing for more accurate predication by the predication pipeline of the noise at the entrance of the user's ear canal based on the measured pinna vibrations.

Figure 6:
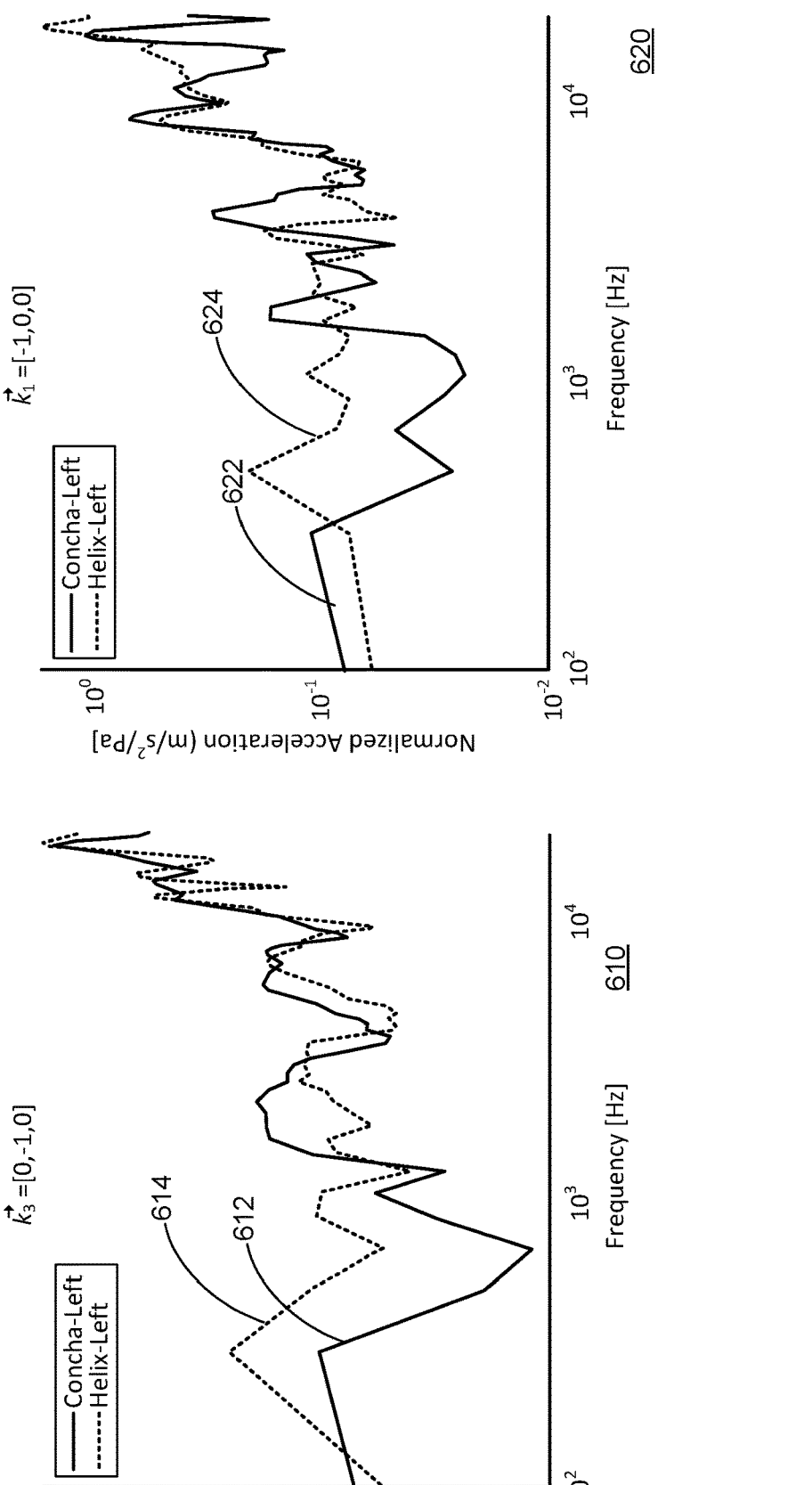
FIG. 6 illustrates graphs showing vibrational response of different portions of a user's pinna in response to acoustic stimuli, in accordance with some embodiments.

FIG. 6 illustrates graphs showing vibrational response of different portions of a user's pinna in response to acoustic stimuli, in accordance with some embodiments. Different parts of the user's pinna for which vibrational response may be measured include the user's concha and the user's helix. Graph 610 illustrates a first plot 612 corresponding to vibration level of a user's left ear concha and a second plot 614 corresponding to a vibration level of a user's left ear helix, responsive to audio stimuli originating from a first direction directly in front of the user's head. Graph 620 illustrates a first plot 622 corresponding to vibration level of a user's left ear concha and a second plot 624 corresponding to a vibration level of a user's left ear helix, responsive to audio stimuli originating from a second direction to the left of the user's head. By being able to accurately model how different parts of the user's pinna (e.g., concha, helix, etc.) respond to noise of different frequencies, an individualized model can be built for a user that allows for the prediction pipeline to more accurately predict the level of noise at the user's ear canal based on detected pinna vibration data. In some embodiments, the headset may include multiple sensors configured to measure vibrations at different locations of the user's pinna, which can be cross-references to obtain a more accurate noise level prediction.

FIG. 7 is a flowchart of a method for performing remote ANC, in accordance with some embodiments. The process 700 shown in FIG. 7 may be performed by components of an audio system, such as the audio system 200 illustrated in FIG. 2. Other entities may perform some or all of the steps in FIG. 7 in other embodiments. Embodiments may include different and/or additional steps, or perform the steps in different orders.

The audio system captures 710, via a sensor located outside an ear of the user, vibrational data associated with sounds from a local area. In some embodiments, the sensor is located on a headset worn by the user, e.g., on a temple arm of a pair of AR glasses. In some embodiments, the vibrational data may corresponds to sound pressure data captured by a microphone located outside the user's ear. In some embodiments, the vibrational data corresponding to vibration levels of the user's pinna capture by a contact sensor, an optical sensor, and/or the like. In some embodiments, the captured data may further include data indicative of a location or direction of a sound source relative to the user's head.

The audio system predicts 720, from the captured vibrational data, a sound pressure level at a location corresponding to the user's ear (e.g., corresponding to an entrance of the user's ear canal). In some embodiments, the audio system uses a trained machine-learning model to predict the sound pressure level at the user's ear based on the captured vibrational data, as well as geometric data indicative of a head and/or ear shape of the user. In some embodiments, the audio system is further configured to compensate for a latency of a prediction pipeline when predicting the sound pressure level, in essence predicting a future sound pressure level based on the currently captured vibrational data. In some embodiments, the audio system configures one or more ANC filters based upon the trained model to process the vibrational data to obtain the predicted sound pressure level.

The audio system generates 730 audio instructions based on the predicted sound pressure level for rendering a cancellation noise based on predicted sound pressure level and a path (referred to as a secondary path) between a location of a transducer outside the user's ear and a location corresponding to user's ear canal. In some embodiments, the cancellation noise is configured to mitigate at least a portion of the predicted sound pressure level.

The audio system renders 740, at a transducer located outside the users, playback of the cancellation noise based upon the generated audio instructions that mitigates the sounds from the local area, based on the predicted sound pressure level at the location corresponding to the user's ear. In some embodiments, the transducer corresponds to a cartilage or bone transducer located on the headset. In some embodiments, the audio system obtains feedback by capturing, at the sensor, vibrational data indicative of a sum of sounds of the local area and the rendered cancellation noise, and adjusting the audio instructions for rendering the cancellation noise accordingly.

Figure 8:
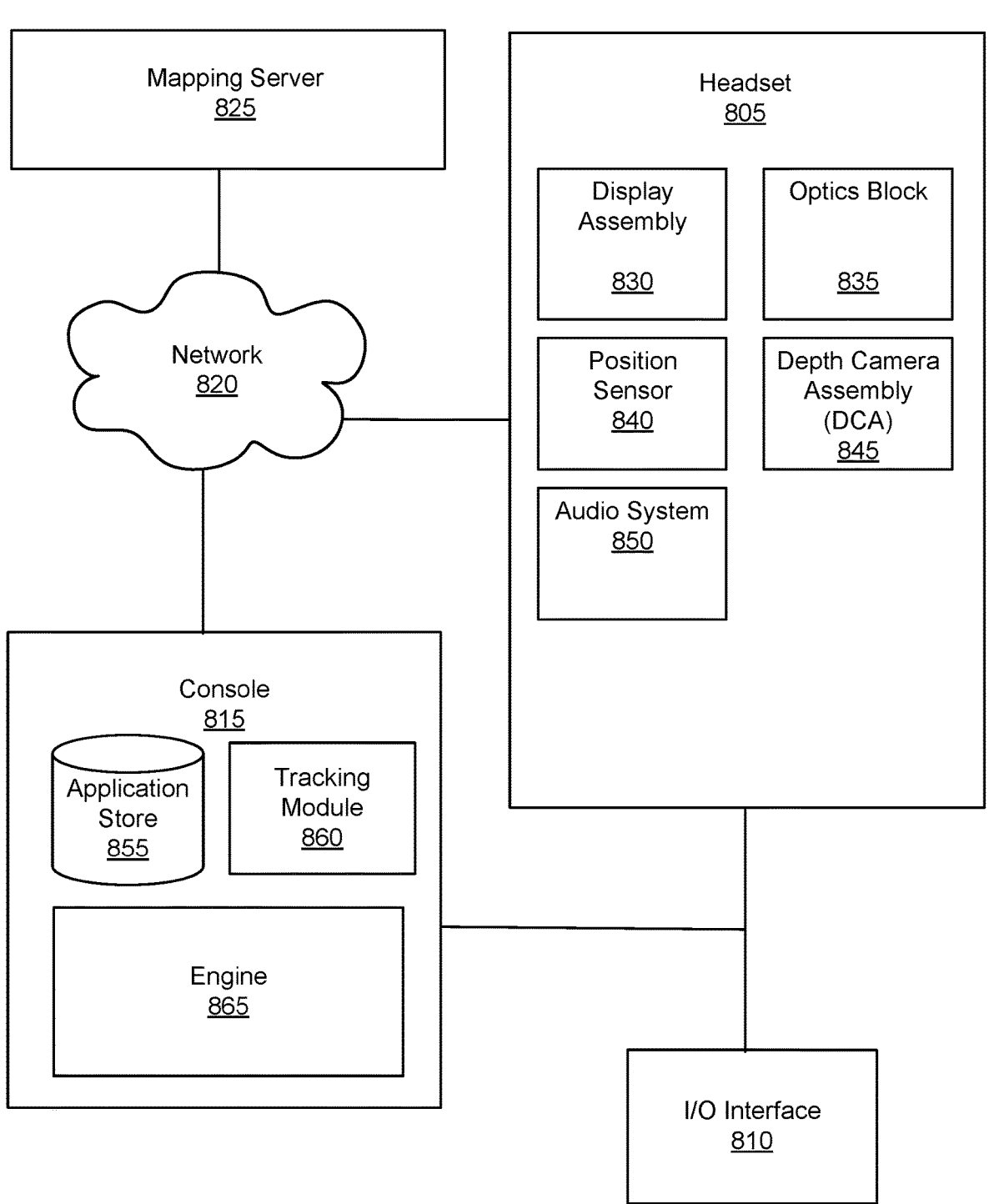
FIG. 8 is a system that includes a headset, in accordance with one or more embodiments.

FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, the DCA 845, and the audio system 850. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 is substantially the same as the audio system 200 described above. The audio system 850 may comprise one or acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user. In addition, the audio system 850 may be used to perform active noise cancellation, as described above. For example, as discussed above, the audio system 850 may comprise sensors located on portions of the headset outside the ear of the user. Using vibrational data measured by the sensor indicative of sounds in the local area, the audio system 850 predicts a sound pressure level at a location corresponding to an entrance to an ear canal of the ear, and generates audio instructions based on the predicted sound pressure level to cause a transducer array to render playback that mitigates sounds from the local area.

The I/O interface 810 is a device that allows a user to send action requests and receive responses from the console 815.

An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of the headset 805 and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 902.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
a sensor located on a portion of the headset outside an ear of a user, wherein the sensor is configured to measure vibrational data associated with sounds from a local area;
a transducer located outside the ear; and
an audio controller configured to:
predict, from the vibrational data, a sound pressure level at a location corresponding to an entrance to an ear canal of the ear using a machine learning model configured to generate a level of anti-noise to be produced by the transducer based on the predicted sound pressure level and a location differential between the ear canal and the transducer,
generate audio instructions based on the predicted sound pressure level, and
cause the transducer to render playback that mitigates the sounds from the local area, based on the predicted sound pressure level at the location corresponding to the ear.

2. The headset of claim 1, wherein the sensor comprises a microphone located outside the ear configured to measure a sound pressure level at the location of the microphone, wherein the audio controller is configured to infer a sound pressure level at the entrance to the ear canal based on the sound pressure level measured by the microphone located outside the ear.

3. The headset of claim 1, wherein the sensor is configured to measure sound-induced vibrations of a pinna of the ear.

4. The headset of claim 3, wherein the sensor comprises a contact accelerometer configured to contact a surface of the pinna.

5. The headset of claim 3, wherein the sensor comprises an optical contact microphone pointing towards a concha bowl of the user.

6. The headset of claim 3, wherein the audio controller is configured to infer a sound pressure level at the entrance to the ear canal based on the measured vibrations.

7. The headset of claim 1, wherein the audio controller is configured to predict, the sound pressure level at the location corresponding to the entrance of the ear canal based in part on a shape of the ear.

8. The headset of claim 7, wherein the shape of the ear is determined based on one or more images captured of the ear.

9. The headset of claim 1, wherein the audio controller is configured to predict, the sound pressure level at the location corresponding to the location of the ear canal using a machine learning model configured to receive as input the vibrational data and data describing a shape of the ear.

10. The headset of claim 1, wherein the transducer is configured to render playback through cartilage conduction or bone conduction.

11. The headset of claim 1, wherein the transducer comprises a plurality of transduction mechanisms, and is configured to render playback as a combination of two or more of air conduction, cartilage conduction, or bone conduction.

12. A system comprising:
a headset comprising:
a sensor located on a portion of the headset outside an ear of a user, wherein the sensor is configured to measure vibrational data associated with sounds from a local area;
a transducer located outside the ear; and
an audio controller configured to:
predict, from the vibrational data, a sound pressure level at a location corresponding to an entrance to an ear canal of the ear using a machine learning model configured to generate a level of anti-noise to be produced by the transducer based on the predicted sound pressure level and a location differential between the ear canal and the transducer,
generate audio instructions based on the predicted sound pressure level, and cause the transducer to render playback that mitigates the sounds from the local area, based on the predicted sound pressure level at the location corresponding to the entrance of the ear canal.

13. The system of claim 12, wherein the sensor comprises a microphone located outside the ear configured to measure a sound pressure level at the location of the microphone, wherein the audio controller is configured to infer a sound pressure level at the entrance to the ear canal based on the sound pressure level measured by the microphone located outside the ear.

14. The system of claim 12, wherein the sensor is configured to measure sound-induced vibrations of a pinna of the ear, and the audio controller is configured to infer a sound pressure level at the location corresponding to the entrance of the ear canal based on the measured vibrations.

15. The system of claim 12, wherein the audio controller is configured to predict, the sound pressure level at the location corresponding to the entrance of the ear canal based on a shape of the ear.

16. The system of claim 15, wherein the shape of the ear is determined based on one or more images captured of the ear.

17. The system of claim 12, wherein the audio controller is configured to predict, the sound pressure level at the location corresponding to the entrance of the ear canal using a machine learning model configured to receive as input the vibrational data and data describing a shape of the ear.

18. The system of claim 12, wherein the transducer is configured to render playback through cartilage conduction or bone conduction.

19. A method comprising:
capturing, at a sensor located outside an ear of a user, vibrational data associated with sounds from a local area;
predicting, from the vibrational data, a sound pressure level at a location corresponding to an entrance to an ear canal of the ear using a machine learning model configured to generate a level of anti-noise to be produced by the transducer based on the predicted sound pressure level and a location differential between the ear canal and the transducer;
generating audio instructions based on the predicted sound pressure level; and
causing a transducer located outside the user's ear to render playback that mitigates the sounds from the local area, based on the predicted sound pressure level at the location corresponding to the entrance to the ear canal.

20. The method of claim 19, wherein the sensor is configured to measure a sound pressure level at the location of the sensor, or to measure sound-induced vibrations of a pinna of the ear.

* * * * *